J. H. RHOMBERG.
PLOW.
APPLICATION FILED OCT. 26, 1917.
1,335,195. Patented Mar. 30, 1920.
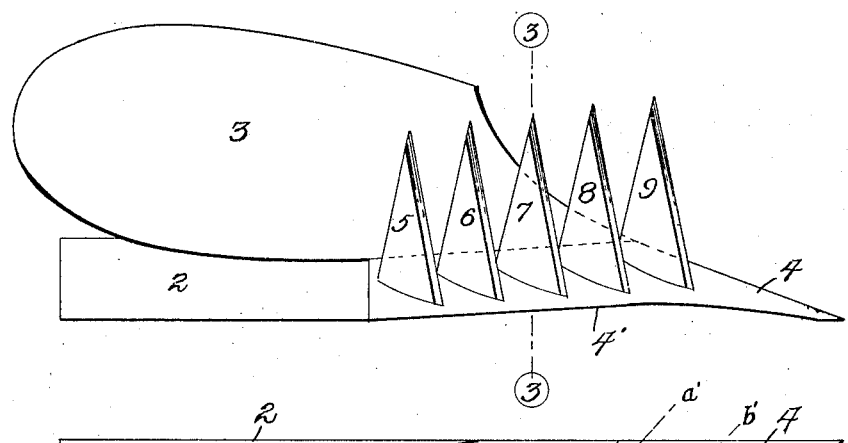
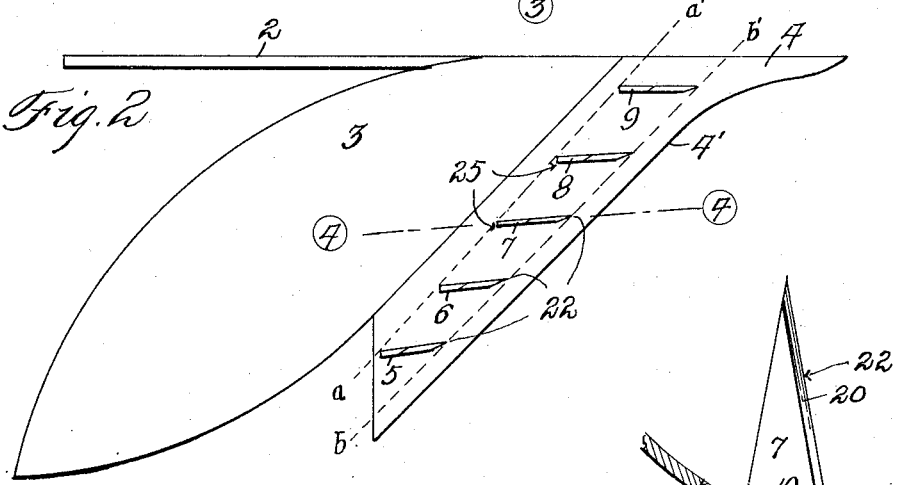
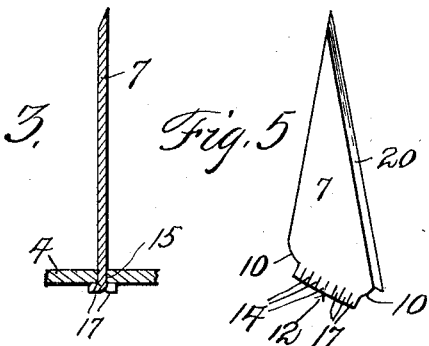
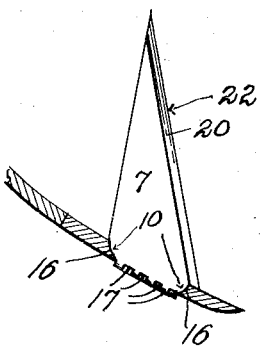
Inventor
Joseph H. Rhomberg.
By M. M. Cady.
Attorney

UNITED STATES PATENT OFFICE.

JOSEPH H. RHOMBERG, OF DUBUQUE, IOWA.

PLOW.

1,335,195.  Specification of Letters Patent.  Patented Mar. 30, 1920.

Application filed October 26, 1917. Serial No. 198,627.

*To all whom it may concern:*

Be it known that I, JOSEPH H. RHOMBERG, a citizen of the United States, residing at Dubuque, in the county of Dubuque and State of Iowa, have invented certain new and useful Improvements in Plows, of which the following is a specification.

My invention relates to agricultural implements, with special reference to implements for preparing the ground for seeding, and the object is to provide a plow that will not only properly turn over the soil, but will also, at the same time, thoroughly pulverize the entire soil down to the bottom of the furrow, and fit it for seeding, and thus do away with the necessity of the use of a harrow or disk for the usual preparation of the land before or after plowing and before seeding.

Another object is to so prepare the soil that there will be produced much larger and better crops and with considerable less expense.

The following specification, with the drawings accompanying the same and forming a part hereof, will fully describe and illustrate by what construction and mode of operation I accomplish the objects sought.

Figure 1 is a perspective of the improved plow.

Fig. 2 is a top plan view.

Fig. 3 is a vertical section through line 3—3 of Fig. 1.

Fig. 4 is a section through line 4—4 of Fig. 2.

Fig. 5 is a perspective of one of the knives.

In the cultivation and producing of potatoes and other agricultural products, the roots of which extend a considerable distance into the ground, it has been found by experiment extending over considerable time and under various conditions of soil and cultivation of the soil, that where the ground at the base of the hill or lower end of the root is thoroughly pulverized and free from lumps, that there will be a large increase in the product, over that where the soil is lumpy and hard and has not been properly pulverized.

The custom has been to use a harrow or disk or both upon the turned over ground or sod, but this pulverizes the soil only to a small and limited depth and does not reach to the depth most needed for the best result.

Having reference to the drawings, 2 designates the land side, 3 the mold-board, and 4 the plowshare. Set back a short distance from the cutting edge of the plowshare are knives 5, 6, 7, 8 and 9, which are constructed from thin sheet steel and are preferably substantially triangular in form, with rounded corners 10, at the base 12, and the space between the rounded corners 10, is cut into slits 14, a short distance apart.

It is of great importance that the knives be rigidly set in the share and in order to conveniently and substantially set the knives so rigidly in the share that there will be no reasonable possibility of deflecting them in plowing even in most unfavorable turf, there are cut slots 15 through the plowshare by a rotary milling machine, slightly narrower than the thickness of the knives, leaving at each end of the slot rounded shoulders 16, in which the rounded corners 10 of the base of the knives snugly fit. The knives are then forced through the slots by heavy pressure until the rounded corners 10 are firmly seated in the shoulders 16. The alternate strips 17 between the slits 14 are bent in opposite directions and clenched against the under side of the plowshare.

The knives are all beveled as at 20, with the beveled sides located on the heel side of the plowshare and the cutting edges 22 located on the point side of the plowshare. The knives are not set in parallelism, but in slightly rearwardly diverging relation, a little farther apart at their rear edges than at the front. The extreme points of their cutting edges aline in parallelism with the front or cutting edge of the plowshare, but their rear edges while alining with each other are neither parallel with the front nor rear edges of the plowshare nor parallel with each other, due to the said divergence and the fact that all of the knives are of the same size. The object in setting the knives in this diverging relation is so that they will have a clearance between them for the dirt and to prevent clogging, and since the moldboard 3 has a continuous and varying curvature, and since the rear edges of the knives are set in different planes to adapt them to meet the varying curvature of the moldboard, it will change the direction of the strips of earth passing between the knives and the strips will be turned and crowded against the rear portions and corners 25 of the knives, and thereby be thoroughly broken and pulverized. Thus it will be seen that the strips of earth as soon as they strike against the moldboard, will be crowded against the diverging rear edges of the knives and broken, and fall into the furrow in a thoroughly comminuted condition, and any sod present in the strips will be separated from the soil and turned over into the furrow on top of the pulverized soil, thus leaving the ground ready for planting without further working.

The rear edges of the knives may set perpendicular to the plowshare, though by setting them at an angle out of the perpendicular, the effect of breaking up the strips of soil is augmented, and by arranging the cutting edges of the knives on an incline, the benefits of a draw-cut are obtained.

What is claimed is:

1. A plow comprising a landside, a moldboard, a share, and upstanding knives fixed in spaced relation upon the upper side of the share and having forward cutting edges; the said knives being converged forwardly, and the intervening spaces between the knives being, in consequence, increased in width rearwardly, for the purpose set forth.

2. In a plow, the combination of a share having a slot the ends of which are concave, and a knife having a base with convex corners disposed in said slot and the concave ends thereof, and also having on the base, between the convex corners, a slitted portion forming strips; said strips being fixed against the underside of the share at opposite sides of the slot therein.

3. In a plow, a moldboard, a plowshare, and a series of knives set in said plowshare in parallelism with the cutting edge of the plowshare and in rearwardly diverging relation with each other.

4. In a plow, a moldboard, a plowshare, and a series of knives set in said plowshare in parallelism with the cutting edge of the plowshare and the knives bearing different angular relations to the cutting edge of the plowshare.

5. In a plow, a moldboard, a plowshare, and knives set in said plowshare in rearwardly diverging relation and each knife being of substantially the same thickness throughout.

6. In a plow, a land side, a rearwardly ascending plowshare arranged upon one side of the land side, a rearwardly ascending moldboard arranged upon the same side of the land side and rearwardly of the plowshare, and a plurality of laterally spaced upstanding knives secured to the plowshare and projecting upwardly above the same for a substantial distance, said blades being angularly arranged with respect to the land side and converging forwardly to a common point in alinement with the forward end of the land side, whereby the angularity of the blades increase away from the land side, said blades having sharp forward cutting edges.

In testimony whereof I affix my signature in the presence of two witnesses.

JOSEPH H. RHOMBERG.

Witnesses:
M. M. CADY,
FRANZ H. WEIHE.